(12) United States Patent
Maier et al.

(10) Patent No.: US 7,295,941 B2
(45) Date of Patent: Nov. 13, 2007

(54) METHOD FOR CORRECTING A CHARACTERISTIC CURVE DERIVED FROM A MAGNETORESISTIVE SENSOR SIGNAL

(75) Inventors: Oliver Maier, Attendorn (DE); Christian Schirp, Dortmund (DE); Frank Bläsing, Werl (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 197 days.

(21) Appl. No.: 11/323,784

(22) Filed: Dec. 30, 2005

(65) Prior Publication Data

US 2006/0155497 A1 Jul. 13, 2006

(30) Foreign Application Priority Data

Jan. 8, 2005 (DE) .................... 10 2005 001 077

(51) Int. Cl.
*G01D 18/00* (2006.01)
*G01R 33/02* (2006.01)

(52) U.S. Cl. ........................................ 702/85; 324/252
(58) Field of Classification Search ........ 324/250–254, 324/202, 207.22; 702/85, 32–35
See application file for complete search history.

(56) References Cited

U.S. PATENT DOCUMENTS 4,525,671 A * 6/1985 Sansom ....................... 324/252
4,686,472 A * 8/1987 Van Ooijen et al. ........ 324/252
5,351,005 A * 9/1994 Rouse et al. ................ 324/252

FOREIGN PATENT DOCUMENTS

| DE | 199 09 890 A1 | 9/2000 |
| DE | 199 47 761 A1 | 4/2001 |
| DE | 199 62 241 A1 | 7/2001 |
| DE | 100 42 006 A1 | 3/2002 |
| DE | 101 48 918 A1 | 4/2003 |
| DE | 103 34 869 B3 | 9/2004 |

* cited by examiner

*Primary Examiner*—John Barlow
*Assistant Examiner*—Victor J. Taylor
(74) *Attorney, Agent, or Firm*—Brooks Kushman P.C.

(57) ABSTRACT

A method for correcting a characteristic curve having values corresponding to displacement between a magnetic sensor element and a magnetic ruler of a sensor within a displacement range includes determining whether the characteristic curve has a jump discontinuity by comparing a first value at a first range end to a second value at a second range end and by comparing values between the range ends. Upon determining that the characteristic curve has a jump discontinuity, the method further includes determining the magnitude of the jump discontinuity, defining a decision threshold lying between the first and second values, identifying the values within the range which are lower than the decision threshold, and offsetting the identified values by the magnitude of the jump discontinuity such that the characteristic curve is corrected to eliminate the jump discontinuity, whereby subsequent measurements made by the MR sensor take into account the jump discontinuity magnitude offset.

13 Claims, 3 Drawing Sheets

METHOD FOR CORRECTING A CHARACTERISTIC CURVE DERIVED FROM A MAGNETORESISTIVE SENSOR SIGNAL

CROSS-REFERENCE TO RELATED APPLICATIONS

This application claims priority to DE 10 2005 001 077.6, filed Jan. 8, 2005, which is hereby incorporated by reference.

BACKGROUND OF THE INVENTION

1. Field of the Invention

The present invention generally relates to a magnetoresistive (MR) sensor having a MR sensor element and a magnetic ruler in which the ruler has alternating magnetic polarization along its length, the sensor element measures the magnetic polarization of the ruler as the sensor element and the ruler move relative to one another, and the sensor element generates a sensor signal indicative of the measured magnetic polarization as a function of the displacement or angular position between the sensor element and the ruler. More particularly, the present invention relates to a method of correcting a characteristic curve derived from measured magnetic polarization values for a measurement range of displacements or angular positions between the MR sensor element and the magnetic ruler of a MR sensor.

2. Background Art

A torque sensor determines torque exerted by a driver on a steering wheel of a motor vehicle. The torque sensor includes an internal hub and an outer rim. The hub torque-locks to a steering shaft of the motor vehicle. Bending spokes connect the hub and the rim. The bending spokes allow the rim to move within a certain rotational angle range with respect to the hub. The hub has outward-projecting limiting spokes for setting a maximum amount of movement between the rim and the hub. The limiting spokes engage in corresponding recesses of the rim such that the range of movement between the rim and the hub is a function of the clearance between the limiting spokes and the recesses of the rim. Accordingly, the range of movement between the rim and the hub extends from no movement up to the maximum amount of movement set by the limiting spokes. Thus, the rim may move relative to the hub at rotational angles falling within the range of movement.

The rim moves relative to the hub when the driver applies torque to the steering wheel. Consequently, the rim and the hub are "offset" from one another by an amount corresponding to the rotational angle of the rim relative to the hub. The offset between two elements such as the hub and the rim represents the displacement or angular position between the two elements.

A torque sensor typically has one or more magnetoresistive (MR) displacement or angular position sensors for detecting the applied torque. Each sensor includes a MR sensor element and a magnetic ruler. The ruler has an alternating magnetic polarization that repeats multiple times over its length. The sensor element and the ruler are movable relative to one another. The sensor element measures the magnetic polarization of the ruler as the sensor element and the ruler move relative to one another. As such, the measured magnetic polarization is indicative of the offset between the sensor element and the ruler.

The sensor element is associated with one of the hub and the rim and the ruler is associated with the other one of the hub and the rim. For example, the sensor element is associated with the hub and the ruler is associated with the rim such that the ruler moves relative to the sensor element as the rim moves relative to the hub. The sensor element measures the magnetic polarization of the ruler as the rim (ruler) moves relative to the hub (sensor element) and generates a sensor signal indicative of the measured magnetic polarization as a function of the offset (i.e., the displacement or angular position) between the hub (sensor element) and the rim (ruler).

The resolution of a torque sensor should be as high as possible and have a correspondingly high accuracy of measurement such that the torque sensor can function with as small as possible an offset between the hub and the rim. As such, efforts are made to make the period of the alternating magnetic polarization of the ruler of the MR sensor be on the order of the magnitude of the maximum possible offset between the hub and the rim such that it is possible to resolve even small offsets between the hub and rim.

The sensor signal generated by a MR sensor for a measurement range of displacements or angular positions between the sensor element and the ruler is evaluated through the arctangent in order to obtain the phase angle of the trigonometric function described by sine and cosine signals having values within a period directly proportional to the displacement or angular position between the sensor element and the ruler. Thus, the arctangent represents a characteristic curve of the MR sensor within the measurement range. A plot of the characteristic curve has measured phase angle values on the "y" axis and displacement or angular position values on the "x" axis.

The selection of the periodic alternating magnetic polarization of the ruler of the MR sensor is limited because the characteristic curve derived from the MR sensor signal may not have any jump discontinuity points within the measurement range. A jump discontinuity jump represents a measured value at a given point in the measurement range which is undefined and therefore cannot be evaluated. As such, the sensor element and the ruler have to be adjusted relative to one another with high accuracy in order that the characteristic curve does not contain any jump discontinuity points within the measurement range. In the periodicity of the alternating magnetic polarization of the ruler it is also necessary to take into account the tolerances to be observed in an arrangement of the sensor element and the ruler to one another when they are being assembled. Therefore, previously known MR displacement or angular position sensors having MR sensor elements and corresponding magnetic rulers have limited resolving power.

SUMMARY OF THE INVENTION

An object of the present invention is to enable a magnetoresistive (MR) displacement or angular position sensor having a MR sensor element and a magnetic ruler to have high resolving power without requiring highly accurate adjustments between the sensor element and the ruler.

In carrying out the above object and other objects, the present invention provides a method for correcting a characteristic curve derived from a sensor signal generated by a MR sensor for a measurement range of displacements or angular positions between the sensor element and the ruler of the MR sensor when the MR sensor is initialized. Sensor signals generated by the MR sensor is indicative of the magnetic polarization of the ruler as measured by the sensor element as the sensor element and the ruler move relative to one another within the measurement range. The characteristic curve derived from the sensor signal when the MR sensor is initialized has a phase angle value indicative of the measured magnetic polarization for given displacement or angular position values falling within the measurement range.

The method generally includes the following steps: (i) determining whether the characteristic curve derived from the sensor signal when the MR sensor is initialized has a jump discontinuity point for any measured phase angle within the measurement range; and, if so, (ii) correcting certain ones of subsequently measured phase angles within the measurement range in order to eliminate the jump discontinuity point from the characteristic curve of the MR sensor such that sensor signals generated by the MR sensor after initialization are void of jump discontinuity points.

The determination of whether the characteristic curve of the MR sensor has a jump discontinuity point for any measured phase angle within the measurement range includes comparing a first phase angle measured at the first end of the measurement range with a second phase angle measured at the second end of the measurement range. A jump discontinuity is determined to be present in the measurement range if the second phase angle has a value that cannot be reconciled with the generally prevailing shape of the characteristic curve from the first phase angle in the direction toward the second phase angle.

If a jump discontinuity point is detected within the measurement range, then the method further includes correcting certain ones of subsequently measured phase angles within the measurement range in order to eliminate the jump discontinuity point from sensor signals subsequently generated by the MR sensor. This step includes defining a phase angle detection threshold (PADT) which lies between the first and second phase angles. Subsequently measured phase angles within the measurement range which have values lower than the PADT are corrected as a function of the magnitude of the jump discontinuity.

The method makes it easily possible to make a phase angle correction (i.e., a correction of the arctangent) for the case in which a jump discontinuity point is present within the measurement range. As indicated above, the method includes first checking to determine whether a jump discontinuity point is present at all within the measurement range. If no jump discontinuity point is present within the measurement range, then no correction needs to be applied to any subsequently measured phase angle.

As indicated above, the two phase angles located at respective ends of the measurement range are compared with one another in order to determine whether a jump discontinuity point is present within the measurement range. If the second phase angle measured at the second end of the measurement range has a value that cannot be reconciled with the general shape of the characteristic curve, then a jump discontinuity point is present within the measurement range. For example, if the general shape of the characteristic curve is rising from the first end of the measurement range to the second end of the measurement range and if the second phase angle is smaller than the first phase angle, then a jump discontinuity point is present within the measurement range. The opposite holds true if the general shape of the characteristic curve is falling from the first end of the measurement range to the second end of the measurement range and if the first phase angle is smaller than the second phase angle.

If a jump discontinuity point is present within the measurement range, then the phase angle decision threshold (PADT) is defined in order to correct certain ones of subsequently measured phase angles within the measurement range. The PADT is defined as a value lying between the values of the first and second phase angles. As an example, the PADT is defined to have a value equivalent to the mean of the first and second phase angles. The PADT defines a certain level in a phase angle diagram that serves as a decision threshold for determining whether or not subsequently measured phase angles in the measurement range should be corrected. When the sensor is operated, if a measured phase angle is located below the PADT, then the measured phase angle is corrected by the magnitude of the jump discontinuity ($=2\delta$). That is, subsequently measured phase angles within the measurement range which have values lower than the PADT are corrected by the magnitude of the jump discontinuity. The undefined phase angle value in the area of the earlier jump discontinuity point then becomes a defined value. As such, the jump discontinuity point is eliminated from sensor signals subsequently generated by the MR sensor.

If an absolute measurement is provided it is necessary to make further corrections in, for example, the characteristic curve in which a jump discontinuity point has been corrected so that a predefined position between two elements which are movable relative to one another has a defined value in the characteristic curve. If such a MR displacement or angular position sensor is used in a torque sensor of a motor vehicle steering wheel the predefined position is defined with the zero position of the two elements which are movable with respect to one another in which the zero position is arranged in the middle of the measurement range.

Consequently, when the MR sensor is used in this way, the level of the characteristic curve is corrected so that the zero position of the two elements is assigned to the zero crossing of the characteristic curve. This correction can be made by determining the phase angle in the zero position of the two elements in which the determined phase angle represents the amount of the correction. This correction amount may also be determined numerically.

The PADT is defined and preferably stored in a retrievable memory when the MR sensor is initialized. For each subsequent phase angle measurement a comparison is made with the PADT to decide whether or not the measured phase angle should be corrected. Thus, the correction process is not very computationally intensive and therefore is suitable above all for automotive applications.

In order to add an overload range to the actually planned measurement range, the latter is expediently be provided in such a way that the sensor element and the alternation in magnetic polarity of the ruler are matched to one another in such a way that the measurement range is smaller than the distance between two points of jump discontinuity in the characteristic curve, expediently approximately 10-20% smaller, depending on how wide the overload range is supposed to be designed.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompanying drawings in which:

DETAILED DESCRIPTION OF THE PREFERRED EMBODIMENT(S)

Figure 1:
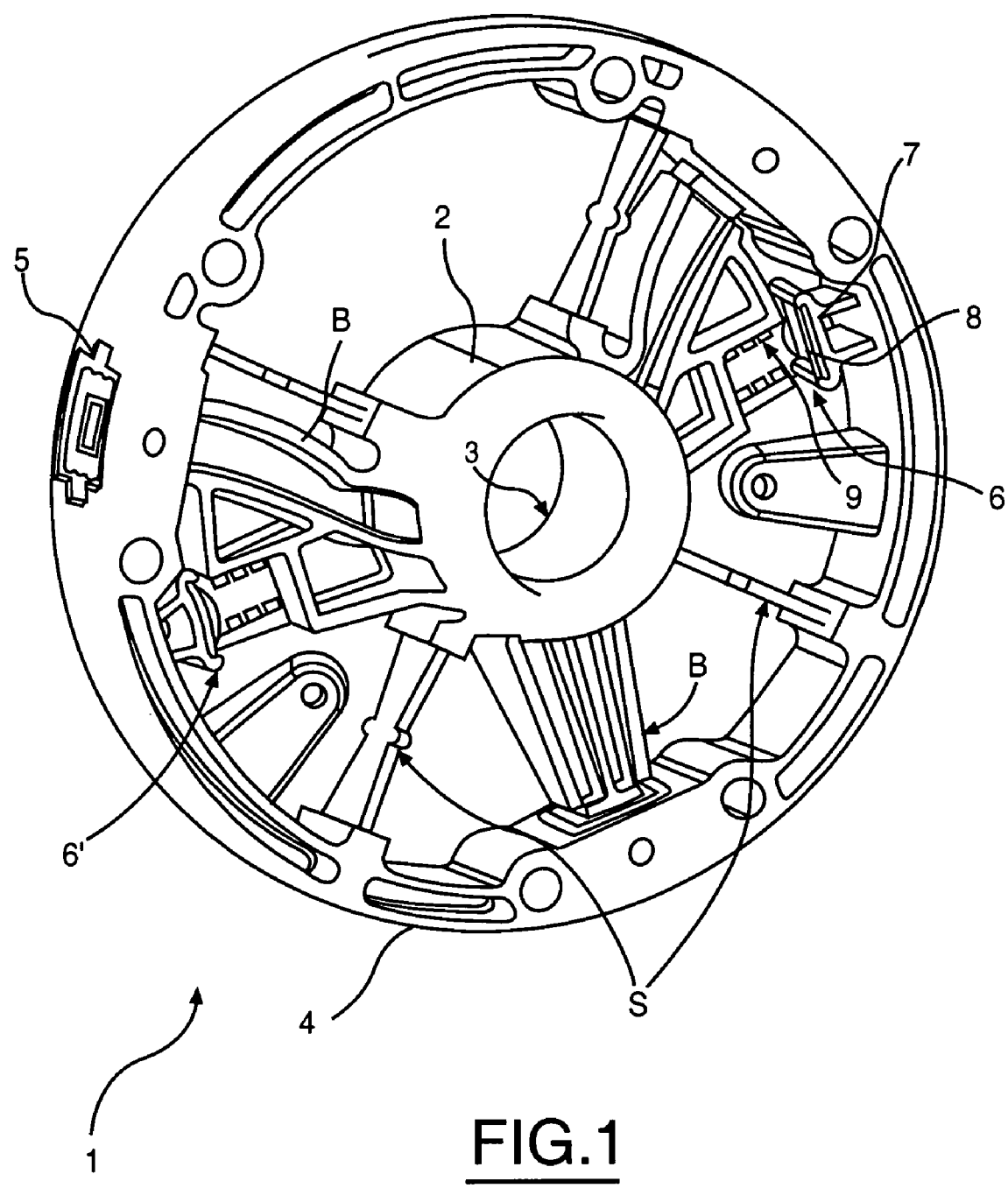
FIG. 1 illustrates a torque sensor for a motor vehicle steering wheel in which the torque sensor has two displacement sensors in accordance with an embodiment of the present invention.

Referring now to FIG. 1, a torque sensor 1 for a motor vehicle steering wheel in which the torque sensor has two displacement sensors 6, 6' in accordance with an embodiment of the present invention is shown. Torque sensor 1 includes an inner hub 2 and an outer rim 4. Hub 2 has inner teeth 4 which enable a torque-locked connection between torque sensor 1 and the motor vehicle steering shaft. Rim 4 is arranged concentric to hub 2. Bending spokes S connect rim 4 to hub 2. Bending spokes S allow rim 4 to move a certain rotational angle with respect to hub 2. Hub 2 includes limiting spokes B which radially project toward rim 4. Each limiting spoke B engages into a limiting recess 5 of rim 4. The clearance, in the direction of rotation of rim 4, of limiting recesses 5 with respect to hub 2 is defined by the desired amount of swiveling of the rim and the hub with respect to one another. The gap is about 500 μm in both directions in the sample embodiment illustrated in FIG. 1.

Torque sensor 1 has two identically built displacement sensors 6, 6' for detecting an offset between hub 2 and rim 4. Displacement sensor 6 includes a magnetic ruler 8 held in a holder 7. Magnetic ruler 8 has a magnetic polarity that periodically alternates at a short interval along the length of the magnetic ruler. Holder 7 with magnetic ruler 8 is arranged on the inside of rim 4.

Displacement sensor 6 further includes a magnetoresistive (MR) sensor element 9. Sensor element 9 is part of hub 2 and interacts with magnetic ruler 8 to detect a torque applied between rim 4 and the hub. Sensor element 9 includes two transducers which are arranged with a phase shift of 90° with respect to one another to pick up the sine and cosine signals having values within a period directly proportional to the displacement between the sensor element and magnetic ruler 8. Sensor element 9 is arranged at a small distance to the periodically magnetized surface of magnetic ruler 8. Thus, a relative rotation between rim 4 and hub 2 is detected as an offset between magnetic ruler 8 and sensor element 9. In this sample embodiment, sensor element 9 and the periodicity of the alternating magnetic polarization placed on magnetic ruler 8 are matched in such a way that the specified measurement range is approximately 10-15% smaller than the pole pitch such that within the specified measurement range a maximum of a single point of jump discontinuity can be present within the calculated characteristic curve.

When displacement sensors 6, 6' are initialized, the first step is to check whether a jump discontinuity point is present at all within a measurement range of displacements (i.e., offsets) between magnetic ruler 8 and sensor element 9. The signals from displacement sensors 6, 6' are evaluated to obtain the respective phase angles from the arctangent. Evaluation through the arctangent gives the phase angle of the trigonometric function described by the sine and cosine signals whose values are, within a period, directly proportional to the offset between magnetic ruler 8 and sensor element 9. Thus, the arctangent represents the characteristic curve of displacement sensors 6, 6' within the measurement range.

Figure 2:
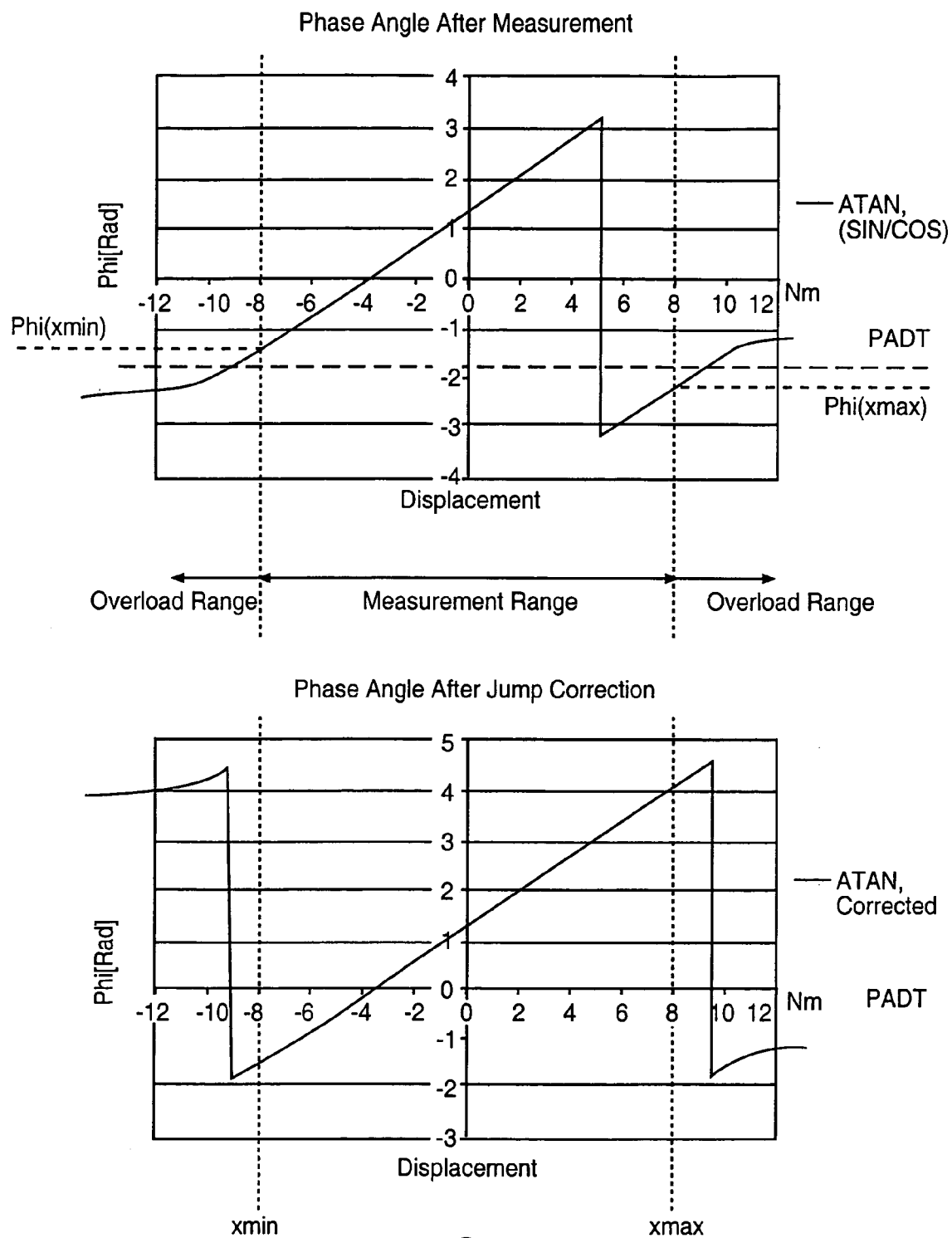
FIG. 2 illustrates two plots representing the measured phase angle (top plot) and the corrected phase angle (bottom plot)

The top plot of FIG. 2 represents a plot of the characteristic curve. The characteristic curve plot has measured phase angle values on the "y" axis and displacement values on the "x" axis. The measured phase angle values are indicative of the magnetic polarization of magnetic ruler 8 as sensed by sensor element 9. The displacement values are indicative of the displacement between magnetic ruler 8 and sensor element 9 within a measurement range of displacement. Thus, each "x, y" point is indicative of the magnetic polarization of magnetic ruler 8 as sensed by sensor element 9 for a given displacement between the magnetic ruler and the sensor element falling within the measurement range.

In order to determine whether the characteristic curve has a jump discontinuity point present within the measurement range the first phase angle Phi(xmin) measured at the left end of the measurement range and the second phase angle Phi(xmax) measured at the right end of the measurement range are compared with one another. The general shape of the characteristic curve as shown in the top plot of FIG. 2 is rising from the first phase angle Phi(xmin) to the second phase angle Phi(xmax). Accordingly, if the second phase angle Phi(xmax) has a value smaller than the value of the first phase angle Phi(xmin), then the characteristic curve has a jump discontinuity point within the measurement range. Otherwise, the characteristic curve does not contain any jump discontinuity point within the measurement range and no correction of the measured phase angles is necessary.

If the characteristic curve has a jump discontinuity point within the measurement range, then a phase angle decision threshold (PADT) is defined. The PADT is used as a basis for deciding which measured phase angles to correct in order to account for the jump discontinuity point. As an example, the PADT is defined as a value equivalent to the mean of the first and second phase angles Phi(xmin) and Phi(xmax). Measured phase angles having values lower than the PADT are corrected by the value 2$\delta$ which corresponds to the magnitude of the jump discontinuity. The lower plot of FIG. 2 represents the plot of the characteristic curve as corrected in this way.

In more detail, the top plot in FIG. 2 of the characteristic curve represents the measured phase angle values for the measurement range of displacement. The first phase angle Phi(xmin) has a measured value of roughly −1.5 and is located at the displacement position of −8.0. The second phase angle Phi(xmax) has a measured value of roughly −2.0 and is located at the displacement position of +8.0. The phase angle at the zero displacement position of 0.0 has a measured value of roughly +1.2. The measurement range extends from the first displacement position of −8.0 to the second displacement position of +8.0. As shown in the top plot of FIG. 2 of the characteristic curve, the general shape of the characteristic curve is rising from the first phase angle Phi(xmin) to the second phase angle Phi(xmax). However, the value of the second phase angle Phi(xmax) is lower than the value of the first phase angle Phi(xmin). More particularly, the measured value of −2.0 of the second phase angle at the right end of the measurement range is lower than the measured value of −1.5 at the left end of the measurement range. As such, a jump discontinuity point is present in the characteristic curve as the general shape of the characteristic curve is rising from the first end of the measurement range to the second end of the measurement range and the second phase angle has a measured value lower than the measured value of the first phase angle. As seen from the top plot of FIG. 2 of the characteristic curve, the jump discontinuity point is located at the displacement position of +5.0 as the measured phase angle at this position does not have a single value. More particularly, the measured phase angle at the displacement position of +5.0 has values falling within the range of +3.0 to −3.0. Thus, the magnitude of the jump discontinuity is +6.0 (i.e., +3.0+|−3.0|=+6.0).

As the characteristic curve has a jump discontinuity point within the measurement range, a phase angle decision threshold (PADT) is defined. As an example, the PADT is defined to have a value equivalent to be the mean of the measured values of the first and second phase angles. As such, in this case, the PADT has a value of −1.75 (i.e., ½*(−1.5+−2.0)=−1.75). Phase angles of the characteristic curve which have measured values lower than −1.75 are designated to be corrected in order to eliminate the jump discontinuity point. Specifically, the value of these phase angles to be corrected are increased by the value 2δ which corresponds to the magnitude of the jump discontinuity. In this case, the value 2δ is +6.0. In this example, the phase angles measured at the displacement positions falling within the displacement position range of +5.0 to +8.0 all have values lower than the PADT value of −1.75. For instance, one of the values of the phase angle measured at the displacement position of +5.0 is −3.0 which is lower than the PADT value of −1.75 and the phase angles measured at the displacement positions of +6.0, +7.0, and +8.0 have respective values of −2.8, −2.5, and −2.0 which are all lower than the PADT value of −1.75.

Accordingly, as shown in the bottom plot of FIG. 2 of the characteristic curve as corrected, the values of the phase angles measured at the displacement positions falling within the displacement range of +5.0 to +8.0 are all increased by +6.0. As such, the measured values of the phase angles at the displacement positions of +5.0, +6.0, +7.0, and +8.0 are corrected to the respective values of +3.0, +3.2, +3.5, and +4.0 as shown in the bottom plot of FIG. 2 of the characteristic curve as corrected. As a result, the characteristic curve as corrected does not have a jump discontinuity point present within the measurement displacement range. Accordingly, when the sensor generates subsequent sensor signals during operation, the measured phase angle values at the displacement positions falling within the range of +5.0 to +8.0 are all increased by the value of +6.0 which corresponds to the magnitude of the jump discontinuity point detected in the characteristic curve of the sensor. The increase of +6.0 to these certain ones of the measured phase angle values essentially tunes the sensor to eliminate jump discontinuity points during subsequent operation of the sensor.

Figure 3:
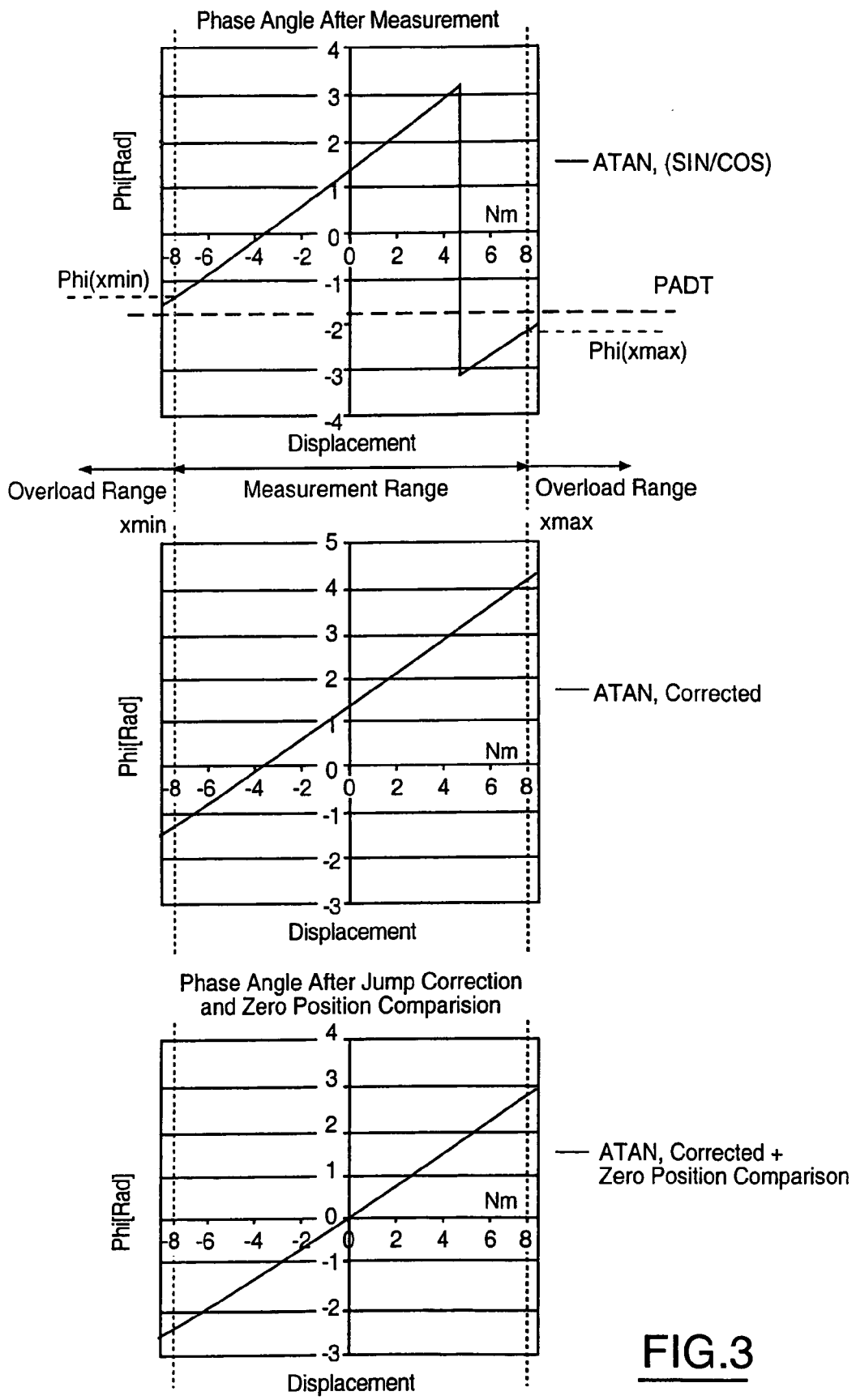
FIG. 3 illustrates three plots representing the measured phase angle (top plot), the corrected phase angle (middle plot), and the corrected phase angle further corrected by a zero position comparison (bottom plot).

The top and middle plots of FIG. 3 illustrate one again the steps of the previously made correction for a jump discontinuity point, which are with regard to the section of the characteristic curve that is shown essentially limited to the measurement range. The top plot of FIG. 3 illustrates the characteristic curve determined from the measured values. The middle plot of FIG. 3 illustrates the characteristic curve which has been corrected for the jump discontinuity point present in the characteristic curve.

In accordance with an embodiment of the present invention, an additional zero position comparison is made as torque sensor 1 is supposed to make an absolute measurement. This additional zero position comparison is done numerically. More particularly, assuming that a jump discontinuity point in the characteristic curve has been detected within the measurement range, the size of the zero position comparison is calculated by the following formula, in which the zero position comparison is designated as "Offset":

Offset=δ+½*[Phi(xmin)+Phi(xmax)]

The offset quantity determined is used to correct each phase angle in order to obtain from it information about the absolute displacement between magnetic ruler 8 and sensor element 9.

For the case in which the characteristic curve does not have a jump discontinuity point within the measurement range, a numerical zero position comparison is made according to the following formula:

Offset=½*[Phi(xmin)+Phi(xmax)]

The above formulas make it clear that the term they contain is the PADT used in the jump correction. Thus, the quantity determined in the preceding jump correction—for the case in which the characteristic curve has a jump discontinuity point within the measurement range—is also used for the zero position comparison.

In the sample embodiment shown, the measurement range and the length of a phase are matched to one another in such a way that an additional overload range is defined at both end areas of the measurement range. This serves the purpose that the actual measurement range that is defined does not end with a stop, and in this way it is possible to detect an overload situation more unambiguously.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

LIST OF REFERENCE NUMBERS

| | |
|---|---|
| 1 | Torque sensor |
| 2 | Hub |
| 3 | Inner teeth |
| 4 | Rim |
| 5 | Limiting recess |
| 6, 6' | Displacement sensor |
| 7 | Holder |
| 8 | Magnetic ruler |
| 9 | Sensor element |
| B | Limiting spoke |
| PADT | Phase angle decision threshold |
| Phi(xmin) | First Phase angle |
| Phi(xmax) | Second Phase angle |
| S | Bending spoke |

What is claimed is:

1. A method for correcting a characteristic curve, the method comprising:

determining whether a characteristic curve having phase angle values corresponding to displacement between a magnetic sensor element and a magnetic ruler of a magnetoresistive (MR) sensor within a range of displacement has a jump discontinuity by comparing a first phase angle value at a first end of the range to a second phase angle value at a second end of the range and by comparing phase angle values between the range ends;

wherein the characteristic curve is determined to have a jump discontinuity if the second phase angle value is lower than the first phase angle value and if the phase angle values between the range ends are generally rising;

wherein the characteristic curve is determined to have a jump discontinuity if the second phase angle value is higher than the first phase angle value and if the phase angle values between the range ends are generally falling;

upon determining that the characteristic curve has a jump discontinuity;
determining the value of the magnitude of the jump discontinuity;
defining a phase angle decision threshold (PADT) to have a value lying between the first and second phase angle values;
identifying the phase angle values within the range having values lower than the PADT value;
identifying the displacements within the range corresponding to the identified phase angle values; and
offsetting the identified phase angle values by the value of the magnitude of the jump discontinuity such that the characteristic curve is corrected to eliminate the jump discontinuity, whereby subsequent measurements made by the MR sensor for the identified displacements take into account the jump discontinuity magnitude offset.

2. The method of claim 1 wherein:
offsetting the identified phase angle values by the value of the magnitude of the jump discontinuity includes adding the value of the magnitude of the jump discontinuity to the identified phase angle values.

3. The method of claim 1 wherein:
limiting the characteristic curve to have a maximum of one jump discontinuity in the range by matching the magnetic sensor element and the magnetic ruler of the MR sensor to one another such that the range is smaller than the separation between two jump discontinuity points of the characteristic curve.

4. The method of claim 3 wherein:
the magnetic sensor element and magnetic ruler of the MR sensor are matched to one another such that the range is 10-20% smaller than the separation between two jump discontinuity points in the characteristic curve.

5. The method of claim 1 further comprising:
making a zero position comparison on the characteristic curve.

6. The method of claim 5 wherein:
making the zero position comparison on the characteristic curve is done numerically using the PADT, wherein the size of the zero position comparison is defined by the value of PADT+δ if the jump discontinuity is present in the characteristic curve within the range, where δ is one half of the magnitude of the jump discontinuity, and is defined by the value of PADT if the characteristic curve does not have a jump discontinuity within the range.

7. A method for correcting a characteristic curve, the method comprising:
determining whether a characteristic curve having values corresponding to displacement between a magnetic sensor element and a magnetic ruler of a magnetoresistive (MR) sensor within a displacement range has a jump discontinuity by comparing a first value at a first range end to a second value at a second range end and by comparing values between the range ends;
wherein the characteristic curve is determined to have a jump discontinuity if the second value is lower than the first value and if the values between the range ends are generally rising;
wherein the characteristic curve is determined to have a jump discontinuity if the second value is higher than the first value and if the values between the range ends are generally falling;
upon determining that the characteristic curve has a jump discontinuity,
determining the magnitude of the jump discontinuity;
defining a decision threshold lying between the first and second values;
identifying the values within the range which are lower than the decision threshold;
identifying the displacements within the range corresponding to the identified values; and
offsetting the identified values by the magnitude of the jump discontinuity such that the characteristic curve is corrected to eliminate the jump discontinuity, whereby subsequent measurements made by the MR sensor for the identified displacements take into account the jump discontinuity magnitude offset.

8. The method of claim 7 wherein:
offsetting the identified values by the magnitude of the jump discontinuity includes adding the magnitude of the jump discontinuity to the identified values.

9. A method for correcting a characteristic curve having values corresponding to displacement between a magnetic sensor element and a magnetic ruler of a magnetoresistive (MR) sensor within a displacement range, the method comprising:
determining whether the characteristic curve has a jump discontinuity by comparing a first value at a first range end to a second value at a second range end and by comparing values between the range ends;
upon determining that the characteristic curve has a jump discontinuity,
determining the magnitude of the jump discontinuity;
defining a decision threshold lying between the first and second values;
identifying the values within the range which are lower than the decision threshold; and
offsetting the identified values by the magnitude of the jump discontinuity such that the characteristic curve is corrected to eliminate the jump discontinuity, whereby subsequent measurements made by the MR sensor take into account the jump discontinuity magnitude offset.

10. The method of claim 9 wherein:
offsetting the identified values by the magnitude of the jump discontinuity includes adding the magnitude of the jump discontinuity to the identified values.

11. The method of claim 10 wherein:
the characteristic curve is determined to have a jump discontinuity if the second value is lower than the first value and if the values between the range ends are generally rising.

12. The method of claim 10 wherein:
the characteristic curve is determined to have a jump discontinuity if the second value is higher than the first value and if the values between the range ends are generally falling.

13. The method of claim 10 wherein upon determining that the characteristic curve has a jump discontinuity the method further includes:
identifying the displacements within the range corresponding to the identified values, whereby subsequent measurements made by the MR sensor for the identified displacements take into account the jump discontinuity magnitude offset.

* * * * *